United States Patent
Han et al.

(10) Patent No.: US 9,135,449 B2
(45) Date of Patent: Sep. 15, 2015

(54) APPARATUS AND METHOD FOR MANAGING USIM DATA USING MOBILE TRUSTED MODULE

(71) Applicant: Electronics and Telecommunications Research Institute, Daejeon (KR)

(72) Inventors: Jin Hee Han, Daejeon (KR); Bo-Heung Chung, Daejeon (KR); Hwa Shin Moon, Daejeon (KR); Yong Hyuk Moon, Daejeon (KR); Dae Won Kim, Daejeon (KR); Jeong Nyeo Kim, Daejoen (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 143 days.

(21) Appl. No.: 13/904,664

(22) Filed: May 29, 2013

(65) Prior Publication Data

US 2014/0033318 A1    Jan. 30, 2014

(30) Foreign Application Priority Data

Jul. 24, 2012 (KR) .................. 10-2012-0080451
Oct. 30, 2012 (KR) .................. 10-2012-0120974

(51) Int. Cl.
| | | |
|---|---|---|
| G06F 21/00 | (2013.01) | |
| G06F 21/60 | (2013.01) | |
| G06F 21/57 | (2013.01) | |
| H04L 29/06 | (2006.01) | |
| H04W 12/04 | (2009.01) | |
| H04W 12/06 | (2009.01) | |

(52) U.S. Cl.
CPC ............... *G06F 21/60* (2013.01); *G06F 21/57* (2013.01); *H04L 63/0428* (2013.01); *H04L 63/0853* (2013.01); *H04W 12/04* (2013.01); *H04W 12/06* (2013.01)

(58) Field of Classification Search
CPC ..... G06F 21/60; G06F 21/57; H04L 63/0428; H04L 63/0853; H04W 12/04; H04W 12/06
USPC .......................................................... 726/26
See application file for complete search history.

(56) References Cited

U.S. PATENT DOCUMENTS 6,950,521 B1 * 9/2005 Marcovici et al. ............ 380/249
7,920,706 B2 * 4/2011 Asokan et al. ................ 380/277
(Continued)

FOREIGN PATENT DOCUMENTS

KR    10-2009-0050152 A    5/2009
KR       20090050152 A  *  5/2009  ............... H04L 9/32
(Continued)

*Primary Examiner* — Hadi Armouche
*Assistant Examiner* — Shahriar Zarrineh

(57) ABSTRACT

An apparatus manages universal subscriber identity module (USIM) data in a terminal using a mobile trusted module (MTM). The apparatus includes a mobile information storage unit configured to store at least one key and the USIM data in a protection region, an information security unit configured to protect information stored in a USIM and the terminal using at least one of the USIM data and the key stored in the mobile information storage unit, and a USIM data manager configured to restore at least one of the USIM data and the key stored in the mobile information storage unit to the USIM, and store at least one of USIM data and the key provided from the USIM in the mobile information storage unit.

8 Claims, 3 Drawing Sheets

(56) References Cited

U.S. PATENT DOCUMENTS

| | | | |
|---|---|---|---|
| 2002/0187808 A1* | 12/2002 | Vallstrom et al. | 455/558 |
| 2004/0235523 A1* | 11/2004 | Schrire et al. | 455/558 |
| 2005/0108532 A1* | 5/2005 | Bajikar | 713/171 |
| 2005/0207562 A1* | 9/2005 | Nachef et al. | 379/357.01 |
| 2006/0089123 A1* | 4/2006 | Frank | 455/411 |
| 2007/0079142 A1* | 4/2007 | Leone et al. | 713/193 |
| 2007/0198861 A1* | 8/2007 | Minami et al. | 713/194 |
| 2008/0261561 A1* | 10/2008 | Gehrmann | 455/411 |
| 2008/0289044 A1* | 11/2008 | Choi | 726/26 |
| 2009/0209232 A1* | 8/2009 | Cha et al. | 455/411 |
| 2009/0228719 A1* | 9/2009 | Almgren et al. | 713/193 |
| 2009/0316908 A1* | 12/2009 | Ekberg et al. | 380/278 |
| 2010/0195833 A1* | 8/2010 | Priestley et al. | 380/273 |
| 2011/0028125 A1* | 2/2011 | Dehlinger et al. | 455/411 |
| 2012/0042170 A1* | 2/2012 | Curtin et al. | 713/185 |
| 2012/0137372 A1* | 5/2012 | Shin et al. | 726/26 |
| 2012/0144092 A1* | 6/2012 | Hsieh et al. | 711/103 |
| 2012/0322505 A1* | 12/2012 | Lodeweyckx | 455/558 |

FOREIGN PATENT DOCUMENTS

| | | | | |
|---|---|---|---|---|
| KR | 20100065012 A | * | 6/2010 | H04L 9/32 |
| KR | 10-2012-0057873 A | | 6/2012 | |

* cited by examiner

APPARATUS AND METHOD FOR MANAGING USIM DATA USING MOBILE TRUSTED MODULE

RELATED APPLICATIONS(S)

This application claims the benefit of Korean Patent Application No. 10-2012-0080451, filed on Jul. 24, 2012 and Korean Patent Application No. 10-2012-0120974, filed on Oct. 30, 2012, which are hereby incorporated by references as if fully set forth herein.

FIELD OF THE INVENTION

The present invention relates to a scheme for managing universal subscriber identity module (USIM) data using a mobile trusted module (MTM), and more particularly, to an apparatus and method for managing USIM data using an MTM, the apparatus and method being suitable for storing, restoring, and managing secret information, which should not be exposed to the outside, or authentication information or issue information of a subscriber, which is stored in a USIM. The MTM is mounted on a terminal.

BACKGROUND OF THE INVENTION

Recently, as a security threat to various terminals including a computer system increases rapidly, solutions therefor are being researched and developed from various angles. They are mainly software security methods. In case of the software security method, if a memory in which user data is stored is stolen or maliciously hacked into by the outside, all private data stored in the memory are leaked. In addition, according to the existing security method, since an encryption key may be easily exposed to the outside, it cannot provide any protection when a terminal is hacked into.

Therefore, to overcome the drawbacks, a hardware security method has been introduced. One of them is a trusted platform module (TPM) chip of a trusted computing group (TCG).

In particular, unlike a central processing unit (CPU), the TPM chip provides an encryption engine as well as a storage space capable of storing a key value, a password, a digital certificates. When manufacturing TPM chips, a unique key, e.g., an endorsement key is assigned to each TPM chip, and a storage root key (SRK) is generated through a process of securing ownership. These keys are not allowed to be leaked to the outside.

Accordingly, the TPM chip can complement, by using its nature, various vulnerable points the software security method has, and it is recently in the limelight by users and persons concerned. The TCG is introducing an MTM chip suitable for a mobile terminal in addition to the TPM chip developed suitable for a PC environment. The MTM chip provides various security functions required in a mobile environment as well as employing a part of security functions provided by the TPM chip.

The MTM chip is mounted on a terminal, and provides local verification and platform integrity verification and guarantee for the terminal. The MTM chip has a shielded location, protected capabilities, a safe and hierarchical key management system, and physical safety. Accordingly, it has a good environment capable of safely storing and managing USIM data.

SUMMARY OF THE INVENTION

It is, therefore, a purpose of the present invention to provide a technology of safely storing and managing secret information, which should not be exposed to the outside, or important subscriber issue information or subscriber authentication information, which are stored in a USIM, using an MTM, and providing a USIM manager or a user with a function of rapidly and conveniently restoring USIM data using data stored in the MTM when an emergency, such as a memory problem and a USIM data processing error, occurs.

In accordance with an aspect of the present invention, there is provided an apparatus of a terminal, which manages universal subscriber identity module (USIM) data using a mobile trusted module (MTM), the apparatus including: a mobile information storage unit configured to store at least one key and the USIM data in a protection region; an information security unit configured to protect information stored in a USIM and the terminal using at least one of the USIM data and the key stored in the mobile information storage unit; and a USIM data manager configured to restore at least one of the USIM data and the key stored in the mobile information storage unit to the USIM, and store at least one of the USIM data and the key provided from the USIM in the mobile information storage unit. Here, an information security unit is managed by MTM.

The USIM data manager may include a USIM data storing unit configured to generate a storage request message for asking the mobile information storage unit to store at least one of the USIM data and the key stored in a memory of the USIM, and transmit the storage request message to the information security unit, and a USIM data restoring unit configured to generate a restoration request message for restoring at least one of the USIM data and the key stored in the mobile information storage unit to the USIM, and transfer the restoration request message to the information security unit.

The information security unit may generate a $SRK_{USIM}$ key for the USIM to store and manage the USIM data.

The information security unit may use manager authentication data provided from the USIM as an input parameter to generate the $SRK_{USIM}$ key.

The manager authentication data may be generated by a key or authentication generation unit of the USIM.

The key or authentication generation unit may generate manager or user authentication data for requesting the generation of the $SRK_{USIM}$ key to store and manage the USIM data, or generate a key value to be used for the transmission and reception of an application protocol data unit (APDU) message.

The key value may have a public key or secret key form.

The USIM may include a data management applet configured to generate a storage request message for asking the mobile information storage unit to store at least one of the USIM data and the key stored in a memory of the USIM, and generate a restoration request message for requesting the restoration of at least one of the USIM data and the key stored in the mobile information storage unit to the USIM.

The data management applet may generate a $SRK_{USIM}$ generation request message used for the storage of the USIM data if a $SRK_{USIM}$ key does not exist when generating the storage request message.

In accordance with another aspect of the present invention, there is provided a method for managing USIM data using an MTM, the method including: transferring, by a data management applet in a USIM, input parameters to an information security unit when a storage function of USIM data is requested, the input parameters being required for generating a $SRK_{USIM}$ key generation message and a key; generating, by the information security unit, a $SRK_{USIM}$ key using the input parameters, and storing the $SRK_{USIM}$ key in a protection region of a mobile information storage unit; transferring, by the data management applet, the USIM data to the information security unit, the USIM data being transferred in a form of an APDU message; converting, by a message conversion unit, the APDU message into an MTM command; asking, by a USIM data storing unit, the information security unit to store the USIM data; and storing, by the information security unit and the mobile information storage unit, the USIM data in the protection region managed by the mobile information storage unit using the $SRK_{USIM}$ key.

The $SRK_{USIM}$ key generation message may be generated by the information security unit when the $SRK_{USIM}$ key for the storage and restoration of the USIM data is not generated.

Manager authentication data in the input parameters may be generated by a key or authentication generation unit.

The USIM data may include issue information or authentication information of a subscriber, manager secret data, and user secret data.

The APDU message may be encrypted using a key generated by the key or authentication generation unit in the USIM and transmitted to the information security unit.

In accordance with still another aspect of the present invention, there is provided a method for managing USIM data using an MTM, the method including: transferring, by a data management applet in a USIM, a data restoration request message for restoring USIM data to an information security unit when a restoration function of the USIM data is requested, the data restoration request message being transferred in a form of an APDU message; converting, by a message conversion unit, the APDU message into an MTM command; asking, by a USIM data restoring unit, the information security unit to restore the USIM data; reading out, by a mobile information storage unit, the USIM data stored in a protection region; restoring, by the USIM data restoring unit, the USIM data; converting, by the message conversion unit, the restored USIM data into a form of an APDU message, and transferring the converted USIM data to the data management applet; and restoring, by the data management applet, the converted USIM data on a memory.

The USIM data may be designated by a manager or a user.

The converted USIM data in the form of the APDU message may be encrypted using a key generated by a key or authentication generation unit in the USIM and transferred to the data management applet.

In accordance with embodiments of the present invention, a USIM data storing and restoring method using an MTM provides a service capable of safely storing and managing secret information of a USIM manager or a user, which should not be leaked to the outside, or important subscriber issue information or subscriber authentication information, which is stored in a USIM, using an MTM mounted on a terminal, unless the manager or the user uses a separate tool for USIM data back-up or restoration. In addition, when an emergency, such as a memory problem and a USIM data processing error, occurs, the method may provide the USIM manager or the user with a function of rapidly and conveniently restoring the USIM data using data stored in the MTM.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Hereinafter, embodiments of the present invention will be described in detail with reference to the accompanying drawings so that they can be readily implemented by those skilled in the art.

Figure 1:
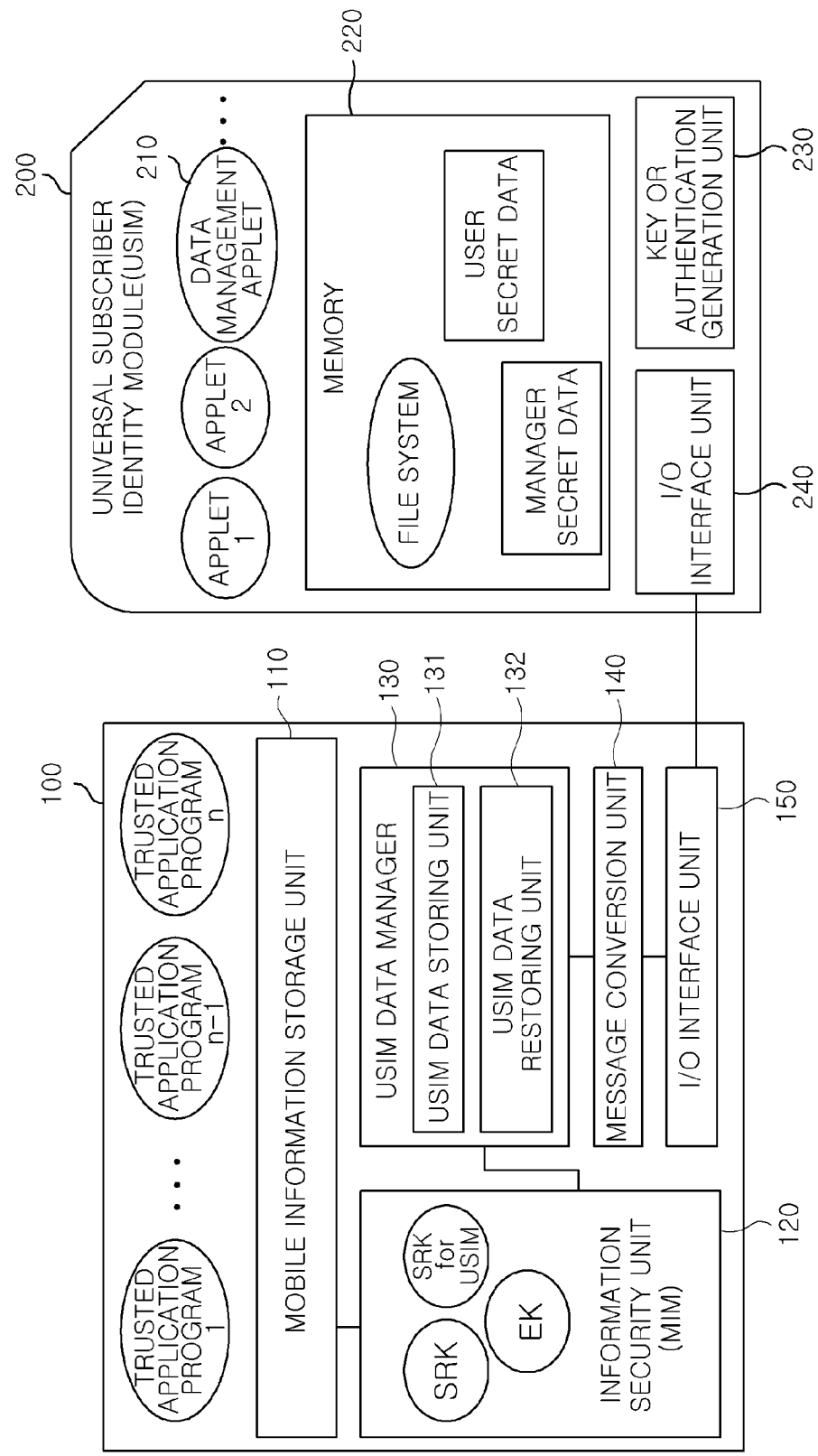
FIG. 1 illustrates configurations of a USIM and a terminal in accordance with an embodiment of the present invention.

FIG. 1 illustrates configurations of a USIM and a terminal in accordance with an embodiment of the present invention. The terminal 100 includes a mobile information storage unit 110, an information security unit 120, a USIM data manager 130, a message conversion unit 140, and an input/output (I/O) interface unit 150. Herein, the USIM data manager 130 includes a USIM data storing unit 131 and a USIM data restoring unit 132. The USIM 200 is freely detachable from the terminal 100, and includes a data management applet 210, a memory 220, a key or authentication generation unit 230, an input/output (I/O) interface unit 240.

Referring to FIG. 1, the mobile information storage unit 110 in the terminal 100 may include mobile time-sharing system (TSS) middleware, and safely store important data and SRK keys that the information security unit 120 generates using input parameters. The information security unit 120 may include a mobile trusted module (MTM), and provide a shielded location, protected capabilities, and a key management system. The information security unit 120 also generates a SRK key for the USIM 200 to store and manage USIM data. Herein, a $SRK_{USIM}$ key may be generated using manager authentication data as an input parameter, the manager authentication data being provided by the USIM 200.

The USIM data storing unit 131 in the USIM data manager 130 generates a storage request message that is a message for asking the mobile information storage unit 110 to store at least one of a key and USIM data stored in the memory 220 in the USIM 200, and transfers the storage request message to the information security unit 120. The USIM data restoring unit 132 generates a restoration request message that is a message for restoring at least one of the key and USIM data stored in the mobile information storage unit 110 to the USIM 200, and transfers the restoration request message to the information security unit 120.

Herein, the terminal 100 includes the I/O interface unit 150 and the message conversion unit 140 for processing messages transmitted between the information security unit 120 and the USIM 200.

The data management applet 210 in the USIM 200 is a subscriber authentication module that is freely detachable from the terminal 100, and performs a function of storing USIM data in the information security unit 120 and restoring the USIM data stored in the information security unit 120. That is, the data management applet 210 generates a storage request message that is a message for asking the mobile information storage unit 110 to store at least one of the USIM data and the key value stored in the memory 220 in the USIM 200. The data management applet 210 also generates a restoration request message that is a message for restoring at least one of the USIM data and the key value stored in the mobile information storage unit 110 to the USIM 200. The data management applet 210 may preferentially generate a $SRK_{USIM}$ generation request message for storing the USIM data when generating the storage request message that is a message for asking the mobile information storage unit 110 to store at least one of the USIM data and the key value stored in the memory 220.

The memory 220 stores a file system, manager secret data, and user secret data. The key or authentication generation unit 230 generates manager or user authentication data for asking the information security unit 120 in the terminal 100 to generate the $SRK_{USIM}$ key required for data storage and restoration, or generates a key value to be used when encrypting an application protocol data unit (APDU) message and transmitting/receiving the APDU message. The I/O interface unit 240 may transmit/receive a command (message) in an APDU form.

In particular, the mobile information storage unit 110 in the terminal 100 stores the SRK key, which is a unique key, and at least one key and secret data, which construct a hierarchical structure by including the $SRK_{USIM}$ key as the center. The information security unit 120 stores at least one key and data, e.g., a password and a digital certificate, which are used for information protection, in the mobile information storage unit 110 and manages the stored data.

The USIM data manager 130 stores the USIM data in the mobile information storage unit 110 using the key values stored in the information security unit 120, and restores the USIM data stored in the mobile information storage unit 110 to the USIM 200 using the key values stored in the information security unit 120. The message conversion unit 140 converts an MTM response message into a response APDU message form that the USIM 200 can understand, or converts the command APDU message transferred from the USIM 200 into an MTM command message that the information security unit 120 can understand.

Herein, the I/O interface unit 150 supports data transmission/reception between the terminal 100 and the USIM 200. Detailed processes for the storage and restoration of the USIM data, which are performed in the mobile information storage unit 110, the information security unit 120, and the USIM data manager 130, are closely related to internal functional modules of the USIM 200, and thus will be described hereinafter together with the explanation for each module (or component) constituting the USIM 200.

The USIM 200 stores at least one key and data, which are stored in the memory 220, in the mobile information storage unit 110 using the information security unit 120 mounted on the terminal 100 through the data management applet 210, and restores the key and data stored in the mobile information storage unit 110 using the information security unit 120 in the terminal 100 through the data management applet 210.

In particular, in the case that the data management applet 210 of the USIM 200 tries to perform the storage and restoration of the USIM data using the information security unit 120, the data management applet 210 of the USIM 200 first asks the information security unit 120 of the terminal 100 to generate the $SRK_{USIM}$ key for the storage and management of the USIM data.

The $SRK_{USIM}$ key is a key value that is to be first generated and stored in the information security unit 120 to store and manage data of the USIM 200 in the mobile information storage unit 110. Manager authentication data of the USIM 200, which is required as an input to generate the $SRK_{USIM}$ key, is generated by the key or authentication generation unit 230 in the USIM 200, and a manager stores the manager authentication data and uses it. The $SRK_{USIM}$ key has a similar feature to that of an SRK key, which is generated through a process of securing the ownership specified in MTM specifications of the information security unit 120 and stored and managed, and is used only for the storage and management of the data of the USIM 200.

The manager of the USIM 200 has the authority of generating, discarding, and managing the $SRK_{USIM}$ key. To maintain confidentialness of data when transmitting the data of the USIM 200 in an APDU message form to store the data of the USIM 200 in the information security unit 120 of the terminal 100, the key or authentication generation unit 230 in the USIM 200 generates a key. Using the key, the whole APDU message is encrypted, or the data of the USIM 200 is only encrypted and transmitted.

At this time, the USIM 200 safely stores and manages the key, which is generated in the USIM 200 to protect the APDU message. Therefore, in case of transferring the key to the information security unit 120, the key generated in the APDU message form is transferred to the information security unit 120. The key generated in the key or authentication generation unit 230 in the USIM 200 can be a public key or a secret key. The key for message protection, which is used to maintain the confidentialness of messages transmitted or received between the information security unit 120 and the USIM 200, can be stored and managed in various manners through the USIM data manager 130 in the terminal 100 and the memory 220 in the USIM 200.

In particular, the data of the USIM 200, which is stored in the information security unit 120 of the terminal 100, may include various data and key values such as authentication information and issue information of a subscriber, secret data of a manager, secret data of a user or a file system stored in the memory 220. Finally, the I/O interface unit 240 in the USIM 200 transmits and receives the APDM message.

That is, an embodiment of the present invention provides the USIM manager or the terminal user with functions of more conveniently and safely managing (storing and restoring) the USIM data through the MTM (information security unit) that provides physical stability and various security functions.

Figure 2:
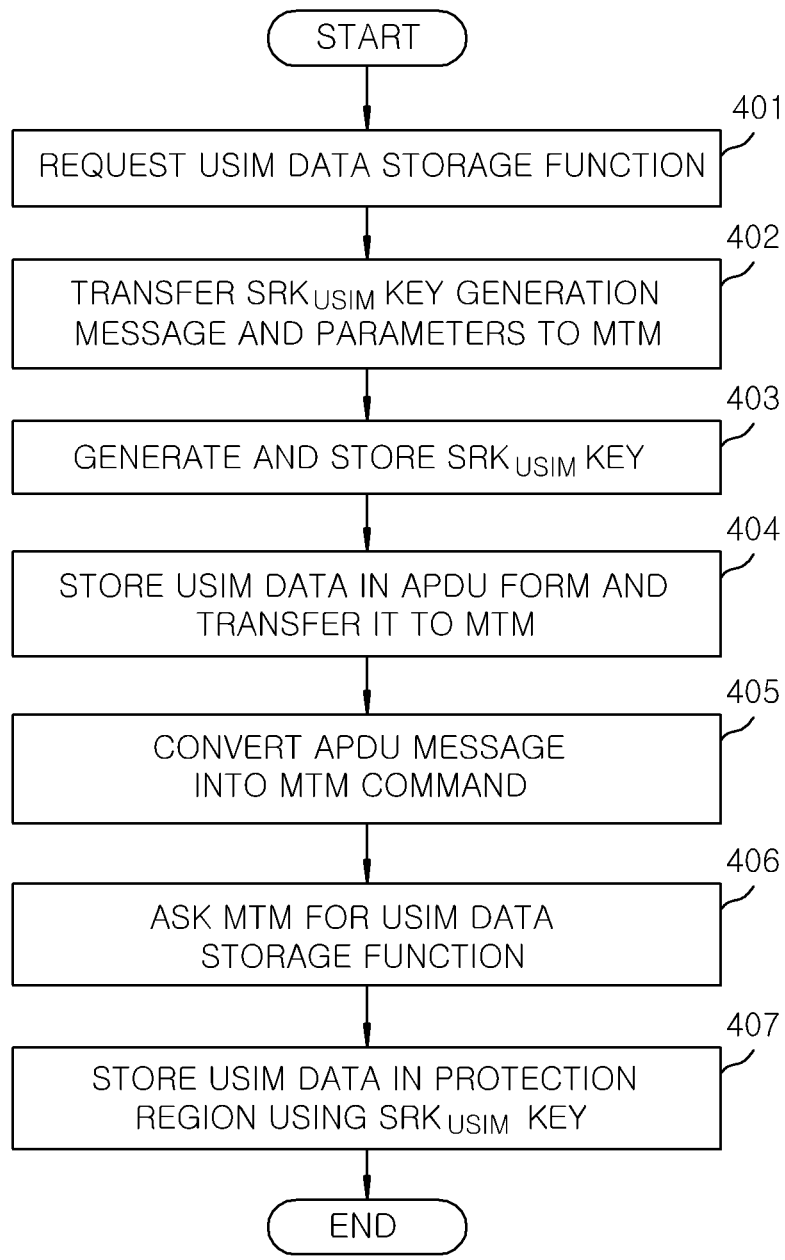
FIG. 2 is a flowchart describing a process of storing USIM data among operational processes of modules in the USIM and the terminal shown in FIG. 1.
Figure 3:
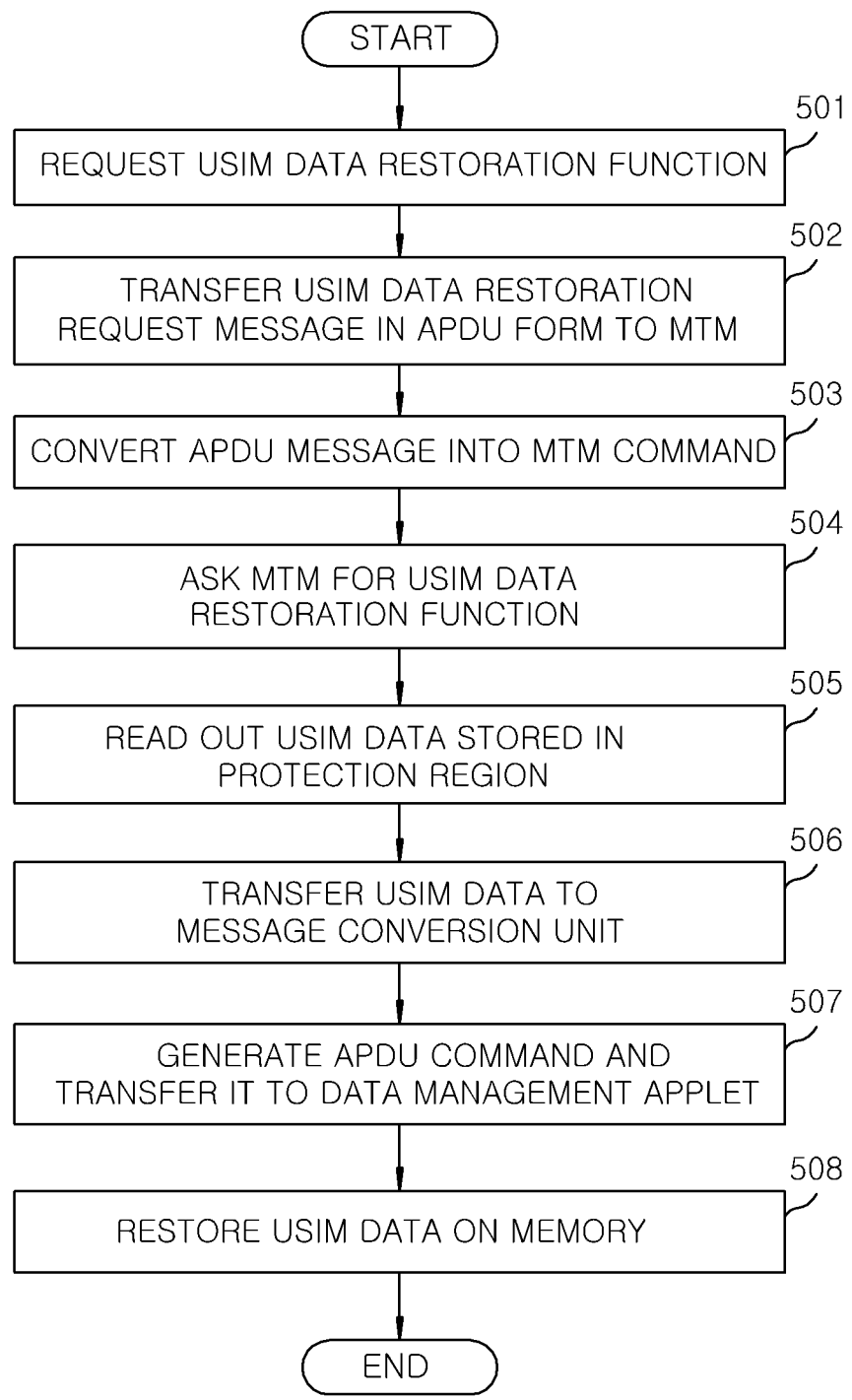
FIG. 3 is a flowchart describing a process of restoring USIM data.

FIG. 2 is a flowchart describing a process of storing the USIM data among operational processes of modules in the USIM 200 and the terminal 100 shown in FIG. 1. FIG. 3 is a flowchart describing a process of restoring the USIM data.

Referring to the process of storing the USIM data described in FIG. 2, first of all, a manager of the USIM 200 asks the data management applet 210 to provide a function of storing the USIM data at step 401.

After that, the data management applet 210 checks whether there is a $SRK_{USIM}$ key. If the $SRK_{USIM}$ key for the storage and restoration of the USIM data has not been generated by the MTM (information security unit), the data management applet 210 transfers input parameters, which are required for key generation, together with a request message for generating the $SRK_{USIM}$ key to the information security unit 120 of the terminal 100 at step 402. At this time, manager authentication data among the input parameters required for the key generation is generated by the key or authentication generation unit 230 in the USIM 200.

Then, the information security unit 120 generates the $SRK_{USIM}$ key using the input parameters including the manager authentication data, and stores the $SRK_{USIM}$ key in a protection region of the information security unit 120 and the mobile information storage unit 110 at step 403.

If the $SRK_{USIM}$ key is successfully generated, the data management applet 210 in the USIM 200 stores data of the USIM 200, which is designated by the manager or a user, in an APDU form, and transfers the data to the information security unit 120 at step 404. At this time, the data of the USIM 200 designated by the manager or the user may include various types of data such as issue information or authentication information of a subscriber, manager secret data, user secret data, and so on. An APDU message transferred to the information security unit 120 is encrypted using a key generated by the key or authentication generation unit 230 in the USIM 200, and safely transmitted.

An APDU request message for storing the USIM data, which is transferred to the terminal 100 through the I/O interface unit 150, is transmitted to the message conversion module 140 and converted into an MTM command at step 405.

In response, the USIM data storage unit 131 in the USIM data manager 130 asks the information security unit 120 to provide the function of storing the USIM data at step 406. In this case, additional MTM command definition may be required to store the USIM data.

Subsequently, the information security unit 120 and the mobile information storage unit 110 safely store the USIM data in the protection region managed by the mobile information storage unit 110 using the $SRK_{USIM}$ key at step 407.

Referring to the process of restoring the USIM data described in FIG. 3, the manager of the USIM 200 asks the data management applet 210 to provide a function of restoring data at step 501.

In response, the data management applet 210 generates an USIM data restoration request message in an APDU form to restore USIM data designated by the manager or the user, and transfers the USIM data restoration request message to the information security unit 120 at step 502. At this time, the USIM data designated by the manager or the user may include various types of data such as issue information or authentication information of a subscriber, manager secret data, user secret data, and so on. The APDU message is safely transferred to the information security unit 120 using a key generated by the key or authentication generation unit 230 in the USIM 200.

After that, the USIM data restoration request APDU message transmitted to the terminal 100 through the I/O interface unit 150 is transferred to the message conversion unit 140, and converted into an MTM command at step 503.

The USIM data restoring unit 132 in the USIM data manager 130 asks the information security unit 120 to provide the function of restoring the USIM data at step 504. In this case, it may be required additional MTM command definition may be required to restore the USIM data.

Then, the information security unit 120 and the mobile information storage unit 110 read out the USIM data safely stored in the protection region managed by the mobile information storage unit 110 using the $SRK_{USIM}$ key at step 505.

Subsequently, the USIM data restoring unit 132 transfers the USIM data, which is obtained through the restoration function of the USIM data, to the message conversion unit 140 at step 506. The message conversion unit 140 converts the USIM data transferred from the USIM data restoring unit 132 into an APDU command, and transfers the APDU command to the USIM data management applet 210 at step 507.

In this case, the APDU message transferred to the information security unit 120 is encrypted using the key generated by the key or authentication generation unit 230 in the USIM 200, and then safely transmitted. A method for distributing and managing keys between the information security unit 120 and the USIM 200 may be implemented in various manners.

Finally, the data management applet 210 in the USIM 200 restores the received USIM data on the memory 220 at step 508.

Meanwhile, combinations of each block of the accompanying block diagram and each step of the accompanying flowchart may be performed by computer program instructions. These computer program instructions may be loaded on a processor of a general-purpose computer, a special-purpose computer, or other programmable data processing equipments. Therefore, the instructions performed by the processor of the computers or other programmable data processing equipments generate units for performing functions explained in each step of the flowchart or each block of the block diagram. Since the computer program instructions can be stored in a computer usable memory or a computer readable memory to be employed in a computer or other programmable data processing equipments to implement functions of the instructions in a specific manner, the instructions stored in the computer usable memory or the computer readable memory can be manufactured as products employing an instruction unit for performing functions explained in each step of the flowchart or each block of the block diagram. Since the computer program instructions can be loaded on the computer or other programmable data processing equipments, a sequence of operating steps is performed on the computer or other programmable data processing equipments to generate a process performed by the computer. Therefore, the instructions processed by the computer or other programmable data processing equipments can provide steps of performing the functions explained in each step of the flowchart and each block of the block diagram.

In addition, each block or each step may represent a part of a module, a segment, or a code including at least one executable instruction for performing specific logical function(s). In accordance with other embodiments, it is noted that the functions mentions in the blocks or steps can be performed regardless of their order. For instance, two blocks or steps illustrated sequentially can be simultaneously performed or the blocks or steps can be performed in reverse order according to their functions.

While the invention has been shown and described with respect to the preferred embodiments, the present invention is not limited thereto. It will be understood by those skilled in the art that various changes and modifications may be made without departing from the scope of the invention as defined in the following claims.

What is claimed is:

1. A method for managing universal subscriber identity module (USIM) data in a terminal using a mobile trusted module (MTM), the method comprising:
    transferring, by a data management applet in a USIM, input parameters to an information security unit in the terminal when a storage function of USIM data is requested, the input parameters being required for generating a storage root key $(SRK)_{USIM}$ key generation message and a key;
    generating, by the information security unit, a $SRK_{USIM}$ key using the input parameters, and storing the $SRK_{USIM}$ key in a protection region of a mobile information storage unit in the terminal;
    transferring, by the data management applet, the USIM data to the information security unit, the USIM data being transferred in a form of an application protocol data unit (APDU) message;

converting, by a message conversion unit in the terminal, the APDU message into an MTM command;

asking, by a USIM data storing unit in the terminal, the information security unit to store the USIM data; and storing, by the information security unit and the mobile information storage unit, the USIM data in the protection region managed by the mobile information storage unit using the $SRK_{USIM}$ key, wherein the USIM data includes issue information or authentication information of a subscriber, manager secret data, and user secret data, and wherein the input parameters include manager authentication data generated by a key or authentication generation unit in the USIM.

2. The method of claim 1, wherein the $SRK_{USIM}$ key generation message is generated by the information security unit when the $SRK_{USIM}$ key for the storage and restoration of the USIM data does not exist.

3. The method of claim 1, wherein the APDU message is encrypted using a key generated by the key or authentication generation unit in the USIM and transmitted to the information security unit.

4. A method for managing universal subscriber identity module (USIM) data in a terminal using a mobile trusted module (MTM), the method comprising:

transferring, by a data management applet in a USIM, input parameters to an information security unit in the terminal when a storage function of USIM data is requested, the input parameters being required for generating a storage root key $(SRK)_{USIM}$ key generation message and a key;

generating the information securit unit a $SRK_{USIM}$ key using the input parameters, and storing the $SRK_{USIM}$ key in a protection region of a mobile information storage unit in the terminal;

transferring, by the data management applet, the USIM data to the information security unit, the USIM data being transferred in a form of a first application protocol data unit (APDU) message;

converting, by a message conversion unit in the terminal, the first APDU message into a first MTM command;

asking, by a USIM data storing unit in the terminal, the information security unit to store the USIM data;

storing, by the information security unit and the mobile information storage unit, the USIM data in the protection region managed by the mobile information storage unit using the $SRK_{USIM}$ key;

transferring, by the data management applet, a data restoration request message for restoring the USIM data to the information security unit when a restoration function of the USIM data is requested, the data restoration request message being transferred in a form of a second APDU message;

converting, by the message conversion unit in the terminal, the second APDU message into a second MTM command;

asking, by a USIM data restoring unit in the terminal, the information security unit to restore the USIM data;

reading out, by the mobile information storage unit, the USIM data stored in the protection region of the mobile information storage unit based on the second MTM command;

restoring, by the USIM data restoring unit, the USIM data;

converting, by the message conversion unit, the restored USIM data into a form of a third APDU message, and transferring the converted USIM data to the data management applet; and storing, by the data management applet, the converted USIM data transferred from the terminal on a memory in the USIM, wherein the USIM data includes issue information or authentication information of a subscriber, manager secret data, and user secret data, and wherein the input parameters include manager authentication data generated by a key or authentication generation unit in the USIM.

5. The method of claim 4, wherein the restoration of the USIM data is designated by a manager or a user.

6. The method of claim 4, wherein the converted USIM data in the form of the third APDU message is encrypted using a key generated by the key or authentication generation unit in the USIM, and the encrypted USIM data is transferred to the data management applet.

7. A terminal for managing universal subscriber identity module (USIM) data using a mobile trusted module (MTM), the terminal comprising:

a storage unit storing at least one key and the USIM data in a protection region; and a processor configured to:
receiving input parameters from a data management applet of a USIM when a storage function of the USIM data is requested, the input parameters being required for generating a storage root key $(SRK)_{USIM}$ key generation message and a key;

generating a $SRK_{USIM}$ key for the USIM using the input parameters, and storing the $SRK_{USIM}$ key in the protection region of the storage unit;

receiving the USIM data from the USIM, the USIM data being transferred in a form of an application protocol data unit (APDU) message;

converting the APDU message into an MTM command; and storing the USIM data in the protection region managed using the $SRK_{USIM}$ key, wherein the USIM data includes issue information or authentication information of a subscriber, manager secret data, and user secret data, and wherein the input parameters include manager authentication data generated by a key or authentication generation unit in the USIM.

8. The terminal of claim 7, wherein the APDU message is encrypted using a key generated by the USIM and transmitted to the terminal.

* * * * *